United States Patent Office 2,726,963
Patented Dec. 13, 1955

2,726,963

CERAMIC COMPOSITION

William M. Jackson II, Watertown, Mass., assignor to Godfrey L. Cabot, Inc., Boston, Mass., a corporation of Massachusetts No Drawing. Application October 8, 1952, Serial No. 313,797

1 Claim. (Cl. 106—46)

This invention relates to compositions for ceramic bodies and to processes for their production. More particularly, this invention relates to compositions for ceramic bodies having improved electrical and physical properties.

As has been known to the art for many years, ceramic articles are composed of different types of base materials, such as clay, fusible materials, such as silicates, and often including small amounts of fluxes or other addition agents. Upon heating, these materials fuse together into a vitrified body having varying properties depending upon the types and quantities of component materials used. This invention is concerned with ceramics having properties particularly adapted for electrical uses.

The properties of ceramic articles sought to be improved for electrical uses are those of dielectric strength and dielectric loss combined with mechanical strength, resistance to thermal shock, corrosion and contamination, and the like. Heretofore, there has been no universal ceramic in which these properties have been combined to the desired degree and hence selection of a ceramic for a given use has been necessarily a compromise in which electrical properties are sacrificed for the physical, or vice versa.

According to this invention, I have found that a ceramic may be produced having all of the desired properties to a greatly enchanced degree when there is present in its composition, consisting otherwise of base and fusible materials, a minor proportion of compounds containing boron and phosphorus.

The effects of including compounds of these two elements together in the composition were wholly unexpected inasmuch as the presence of neither element by itself materially improved the ceramic product. Together the boron and phosphorus compounds produce a remarkable synergistic effect creating a eutectic so that upon firing the properties of the ceramic are improved to a remarkable extent. Additionally, the firing of my novel composition is greatly simplified since lower firing temperatures may be used and variations of as much as ±50° F. in the firing temperature are tolerable, whereas otherwise similar compositions permit of only slight variations in firing temperatures.

It is thus the principal object of my invention to provide novel compositions for ceramic bodies which will have combined therein all of the above-described properties in a degree hitherto unknown.

It is a further object of my invention to provide novel compositions for ceramic bodies having high dielectric strength and low dielectric loss properties combined with superior physical properties.

It is a further object of my invention to provide novel compositions having relatively low firing temperatures and wide firing tolerance.

It is a further object of my invention to provide a process for the production of such compositions.

Going into more detail, the novel composition of my invention will preferably consist, in addition to the boron and phosphorus compounds, of any suitable ceramic grade kaolin, ball or china clay, or mixtures of such clays as the base material and a silicate, or mixtures of silicates, such as feldspar, wollastonite (anhydrous calcium silicate), steatite (hydrous magnesium silicate), calcium zirconium silicate, cordierite (magnesium aluminum silicate) and the like as the fusible material. The proportions of the ingredients will range substantially as follows:

| | Per cent by weight |
|---|---|
| Fusible material | 70–90 |
| Base material | 4–28 |
| Boron compound | 0.2–1 |
| Phosphorus compound | 1.8–9.8 |

When an addition agent is included it will not constitute more than about 5% of the weight of the composition.

The compounds of boron and phosphorus usable in the novel composition of my invention are those of which the elements combined with the boron and phosphorus are not incompatible with the other ingredients of the composition. The preferred compound is commercially available boron phosphate ($BPO_4$) which may be produced by reaction between boric and phosphoric acids. This compound may be easily introduced into the ceramic composition and performs its function efficiently. It, or its equivalent, will always constitute between about 2 and 10% by weight of the composition of this invention. Other compounds usable therein in accordance with my invention are boric and phosphoric acids and borates and phosphates of the metals of groups 2, 3 and 4 of the periodic table of elements.

Electrical grade ceramics are commonly evaluated in accordance with testing procedures set forth in the joint Army-Navy specification JAN–1–10 of April 29, 1944 and are therein graded and designated L–1, L–2, L–3, etc. The properties tested in accordance therewith are loss factor, dielectric strength, flexural strength, resistance to thermal change and porosity. In loss factor and dielectric strength ceramics produced from my novel composition are superior to or at least the equal of the best known compositions and in the average of all properties are significantly superior to all of the known compositions. For example, bodies made principally of zirconium silicate may have greater flexural (mechanical) strength than those made from the compositions of this invention but they are relatively poor in loss factor.

In the following examples are shown the electrical properties of representative compositions of my invention compared with compositions otherwise substantially equivalent except for the presence of boron phosphate.

*Example 1*

Compositions were prepared as follows:

| | Percent by weight | |
|---|---|---|
| | A | B |
| Wollastonite | 70 | 73 |
| Clay (Old Mine #4) | 20 | 14 |
| Barium zirconium silicate | 10 | 10 |
| Boron phosphate ($BPO_4$) | | 3 |

The composition was moulded into disks ¼" thick and 3" in diameter for the loss factor test and 5" in diameter for the power factor test. After vitrification the disks were immersed for 48 hours in water and thereafter tested according to the procedure set forth in the JAN–1–10 specification mentioned above. At a frequency of 1 megacycle per second in the Boonten Q-meter the following results were obtained

|  | A | B |
|---|---|---|
| Dielectric constant | 6.78 | 6.5 |
| Power factor | 0.0073 | 0.0046 |
| Loss factor | 0.0490 | 0.0030 |

The marked superiority of B composition over A composition containing no compounds of boron and phosphorus is obvious. When it is considered that these are unglazed materials the loss factor of only 0.0030 for the B composition, which is halfway between L-6 and L-7, is truly remarkable. There is no unglazed composition now known, so far as I am aware, that has so low a loss factor on wet testing.

The B composition in repeated tests was definitely superior to A in resistance to thermal shock. Further sample B was fired at a temperature 100° F. lower than the firing temperature for sample A, which, as is well known to those skilled in the art, is a very important advantage.

*Example 2*

Two other compositions containing no fusible material other than wollastonite were prepared as follows:

|  | Parts by weight | |
|---|---|---|
|  | A | B |
| Wollastonite | 85 | 85 |
| Clay (Old Mine #4) | 10 | 10 |
| Boron Phosphate |  | 5 |

Disks were prepared and tested as in Example 1. The following test results were obtained:

|  | A | B |
|---|---|---|
| Dielectric constant | 7.2 | 5.9 |
| Power factor | above max. reading | 0.0013 |
| Loss factor | do | 0.0079 |

The effect of the boron phosphate on the composition is strikingly demonstrated in this example. A composition containing only wollastonite and clay is clearly almost useless as insulating material. However, by adding the boron-phosphorus compounds to the mixture an insulating material in the L-2 range resulted.

It is thus evident that by the simple expedient of adding compounds of both boron and phosphorus to a ceramic composition vastly improved properties result. Not only are the electrical properties of the vitrified body improved thereby but also no deterioration of the physical properties, i. e., strength, resistance to thermal shock, etc., results which is invariably the case when other fusible materials are included in the composition in order to improve electrical properties.

It is clear that the incorporation of compounds of both boron and phosphorus in the novel composition of this invention has led to a wholly unexpected result and provides a ceramic end product having properties never before present in known compositions. The improvement over compositions containing compounds either of boron or phosphorus alone is more than simply additive but is truly synergistic.

Having thus disclosed my invention and described in detail illustrative embodiments thereof, I claim as new and desire to secure by Letters Patent:

A ceramic body essentially comprising wollastonite 70-90% by weight, base material selected from the group consisting of kaolin, ball clay and china clay 4-28% by weight and boron phosphate 2-10% by weight.

References Cited in the file of this patent

UNITED STATES PATENTS 2,486,811    Weyl _____ Nov. 1, 1949